United States Patent
Meyerzon et al.

(10) Patent No.: US 7,716,198 B2
(45) Date of Patent: May 11, 2010

(54) RANKING SEARCH RESULTS USING FEATURE EXTRACTION

(75) Inventors: Dmitriy Meyerzon, Bellevue, WA (US); Hang Li, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 495 days.

(21) Appl. No.: 11/019,091

(22) Filed: Dec. 21, 2004

(65) Prior Publication Data

US 2006/0136411 A1    Jun. 22, 2006

(51) Int. Cl.
G06F 17/30    (2006.01)
(52) U.S. Cl. ............... 707/706; 707/707; 707/708; 707/723; 707/727; 707/728; 707/736; 707/748; 707/758; 707/767
(58) Field of Classification Search .............. 707/3, 707/5–7
See application file for complete search history.

(56) References Cited

U.S. PATENT DOCUMENTS

| | | | |
|---|---|---|---|
| 5,222,236 A | 6/1993 | Potash et al. | 707/102 |
| 5,257,577 A | 11/1993 | Clark | 100/99 |
| 5,594,660 A | 1/1997 | Sung et al. | 715/500.1 |
| 5,606,609 A | 2/1997 | Houser et al. | 713/179 |
| 5,848,404 A | 12/1998 | Hafner et al. | 707/3 |
| 5,893,092 A * | 4/1999 | Driscoll | 707/5 |
| 5,920,859 A | 7/1999 | Li | 707/5 |
| 5,933,851 A | 8/1999 | Kojima et al. | 711/133 |
| 5,960,383 A | 9/1999 | Fleischer | 704/9 |
| 5,983,216 A * | 11/1999 | Kirsch et al. | 707/2 |
| 5,987,457 A * | 11/1999 | Ballard | 707/5 |
| 6,006,225 A * | 12/1999 | Bowman et al. | 707/5 |
| 6,012,053 A * | 1/2000 | Pant et al. | 707/3 |

(Continued)

FOREIGN PATENT DOCUMENTS

EP    0950961 A2    10/1999

(Continued)

OTHER PUBLICATIONS

Brin, S. et al., "The Anatomy of a Large-Scale Hypertextual Web Search Engine", Proceedings of the Seventh International World-Wide Web Conference, 'Online! Apr. 14, 1998, pp. 1-26.

(Continued)

*Primary Examiner*—Don Wong
*Assistant Examiner*—Thanh-Ha Dang
(74) *Attorney, Agent, or Firm*—Merchant & Gould, P.C.

(57) ABSTRACT

Methods and computer-readable media are provided for ranking search results using feature extraction data. Each of the results of a search engine query is parsed to obtain data, such as text, formatting information, metadata, and the like. The text, the formatting information and the metadata are passed through a feature extraction application to extract data that may be used to improve a ranking of the search results based on relevance of the search results to the search engine query. The feature extraction application extracts features, such as titles, found in any of the text based on formatting information applied to or associated with the text. The extracted titles, the text, the formatting information and the metadata for any given search results item are processed according to a field weighting application for determining a ranking of the given search results item. Ranked search results items may then be displayed according to ranking.

20 Claims, 4 Drawing Sheets

U.S. PATENT DOCUMENTS

| | | | |
|---|---|---|---|
| 6,032,196 A | 2/2000 | Monier | 709/245 |
| 6,041,323 A | 3/2000 | Kubota | 707/5 |
| 6,070,158 A * | 5/2000 | Kirsch et al. | 707/3 |
| 6,070,191 A | 5/2000 | Narendran et al. | 709/226 |
| 6,098,064 A | 8/2000 | Pirolli et al. | 707/2 |
| 6,125,361 A | 9/2000 | Chakrabarti et al. | 707/3 |
| 6,128,701 A | 10/2000 | Malcolm et al. | 711/133 |
| 6,145,003 A | 11/2000 | Sanu et al. | 709/225 |
| 6,151,624 A | 11/2000 | Teare et al. | 709/217 |
| 6,167,369 A | 12/2000 | Schulze | 704/9 |
| 6,182,085 B1 | 1/2001 | Eischstaedt et al. | 707/104.1 |
| 6,182,113 B1 | 1/2001 | Narayanaswami | 709/203 |
| 6,185,558 B1 | 2/2001 | Bowman et al. | 707/5 |
| 6,202,058 B1 | 3/2001 | Rose et al. | 706/45 |
| 6,208,988 B1 * | 3/2001 | Schultz | 707/5 |
| 6,216,123 B1 * | 4/2001 | Robertson et al. | 707/3 |
| 6,222,559 B1 | 4/2001 | Asano et al. | 345/440 |
| 6,240,407 B1 | 5/2001 | Chang et al. | 707/2 |
| 6,240,408 B1 * | 5/2001 | Kaufman | 707/3 |
| 6,247,013 B1 | 6/2001 | Morimoto | 707/10 |
| 6,263,364 B1 | 7/2001 | Najork et al. | 709/217 |
| 6,285,367 B1 | 9/2001 | Abrams et al. | 345/357 |
| 6,285,999 B1 | 9/2001 | Page | 707/5 |
| 6,304,864 B1 | 10/2001 | Liddy et al. | 706/15 |
| 6,317,741 B1 * | 11/2001 | Burrows | 707/5 |
| 6,327,590 B1 | 12/2001 | Chidlovskii et al. | 707/5 |
| 6,349,308 B1 | 2/2002 | Whang et al. | 707/107 |
| 6,351,467 B1 | 2/2002 | Dillon | 370/432 |
| 6,351,755 B1 | 2/2002 | Najork et al. | 707/501.1 |
| 6,360,215 B1 | 3/2002 | Judd et al. | 707/3 |
| 6,385,602 B1 * | 5/2002 | Tso et al. | 707/3 |
| 6,389,436 B1 | 5/2002 | Chakrabarti et al. | 715/513 |
| 6,418,433 B1 | 7/2002 | Chakrabarti et al. | 707/5 |
| 6,418,452 B1 | 7/2002 | Kraft et al. | 707/200 |
| 6,418,453 B1 | 7/2002 | Kraft et al. | 707/200 |
| 6,442,606 B1 | 8/2002 | Subbaroyan et al. | 709/224 |
| 6,473,752 B1 * | 10/2002 | Fleming, III | 707/4 |
| 6,484,204 B1 | 11/2002 | Rabinovich | 709/226 |
| 6,516,312 B1 | 2/2003 | Kraft et al. | 707/3 |
| 6,539,376 B1 | 3/2003 | Sundaresan et al. | 707/5 |
| 6,546,388 B1 | 4/2003 | Edlund et al. | 707/5 |
| 6,547,829 B1 | 4/2003 | Meyerzon et al. | 715/501.1 |
| 6,549,896 B1 * | 4/2003 | Candan et al. | 707/2 |
| 6,549,897 B1 | 4/2003 | Katariya et al. | 707/5 |
| 6,594,682 B2 | 7/2003 | Peterson et al. | 718/102 |
| 6,598,047 B1 | 7/2003 | Russell et al. | 707/5 |
| 6,598,051 B1 | 7/2003 | Wiener et al. | 7/100 |
| 6,601,075 B1 | 7/2003 | Huang et al. | 707/104.1 |
| 6,622,140 B1 | 9/2003 | Kantrowitz | 707/5 |
| 6,628,304 B2 | 9/2003 | Mitchell et al. | 345/734 |
| 6,633,867 B1 | 10/2003 | Kraft et al. | 707/3 |
| 6,633,868 B1 | 10/2003 | Min et al. | 707/3 |
| 6,636,853 B1 | 10/2003 | Stephens | 707/10 |
| 6,638,314 B1 | 10/2003 | Meyerzon et al. | 715/234 |
| 6,671,683 B2 | 12/2003 | Kanno | 707/5 |
| 6,701,318 B2 | 3/2004 | Fox et al. | 707/10 |
| 6,718,324 B2 | 4/2004 | Edlund et al. | 707/5 |
| 6,718,365 B1 | 4/2004 | Dutta | 709/203 |
| 6,738,764 B2 * | 5/2004 | Mao et al. | 707/5 |
| 6,763,362 B2 | 7/2004 | McKeeth | 707/104.1 |
| 6,766,316 B2 | 7/2004 | Caudill et al. | 707/3 |
| 6,766,422 B2 | 7/2004 | Beyda | 711/137 |
| 6,775,659 B2 | 8/2004 | Clifton-Bligh | 707/1 |
| 6,775,664 B2 | 8/2004 | Lang et al. | 707/3 |
| 6,778,997 B2 | 8/2004 | Sundaresan et al. | 707/104.1 |
| 6,829,606 B2 | 12/2004 | Ripley | 707/5 |
| 6,859,800 B1 * | 2/2005 | Roche et al. | 707/3 |
| 6,862,710 B1 | 3/2005 | Marchisio | 715/501.1 |
| 6,871,202 B2 | 3/2005 | Broder | 707/7 |
| 6,883,135 B1 | 4/2005 | Obata et al. | 715/202 |
| 6,886,010 B2 | 4/2005 | Kostoff | 707/3 |
| 6,886,129 B1 | 4/2005 | Raghavan et al. | 715/501.1 |
| 6,910,029 B1 * | 6/2005 | Sundaresan | 707/2 |
| 6,931,397 B1 | 8/2005 | Sundaresan | 707/5 |
| 6,934,714 B2 | 8/2005 | Meinig | 707/102 |
| 6,944,609 B2 | 9/2005 | Witbrock | 707/3 |
| 6,947,930 B2 | 9/2005 | Anick et al. | 707/5 |
| 6,959,326 B1 | 10/2005 | Day et al. | 709/217 |
| 6,973,490 B1 | 12/2005 | Robertson et al. | 709/224 |
| 6,990,628 B1 | 1/2006 | Palmer et al. | 707/501 |
| 7,016,540 B1 | 3/2006 | Gong et al. | 382/225 |
| 7,028,029 B2 | 4/2006 | Kamvar et al. | 707/5 |
| 7,039,234 B2 * | 5/2006 | Geidl et al. | 382/187 |
| 7,051,023 B2 | 5/2006 | Kapur et al. | 707/5 |
| 7,072,888 B1 | 7/2006 | Perkins | 707/10 |
| 7,076,483 B2 | 7/2006 | Preda et al. | 707/5 |
| 7,080,073 B1 | 7/2006 | Jiang et al. | 707/7 |
| 7,107,218 B1 | 9/2006 | Preston | 704/270 |
| 7,152,059 B2 * | 12/2006 | Monteverde | 707/3 |
| 7,181,438 B1 | 2/2007 | Szabo | 707/2 |
| 7,179,497 B2 | 3/2007 | Cossock | 707/7 |
| 7,243,102 B1 | 7/2007 | Naam et al. | 707/7 |
| 7,246,128 B2 | 7/2007 | Jordahl | 707/100 |
| 7,257,574 B2 * | 8/2007 | Parikh | 707/3 |
| 7,257,577 B2 | 8/2007 | Fagin et al. | 707/7 |
| 7,260,573 B1 | 8/2007 | Jeh et al. | 707/7 |
| 7,281,002 B2 * | 10/2007 | Farrell | 707/3 |
| 7,308,643 B1 | 12/2007 | Zhu et al. | 715/206 |
| 7,328,401 B2 | 2/2008 | Obata et al. | 707/3 |
| 7,428,530 B2 * | 9/2008 | Ramarathnam et al. | 707/3 |
| 7,519,529 B1 | 4/2009 | Horvitz | 704/7 |
| 2001/0042076 A1 | 11/2001 | Fukuda | 707/500 |
| 2002/0055940 A1 | 5/2002 | Elkan | 707/104.1 |
| 2002/0062323 A1 | 5/2002 | Takatori et al. | 707/514 |
| 2002/0078045 A1 * | 6/2002 | Dutta | 707/7 |
| 2002/0099694 A1 * | 7/2002 | Diamond et al. | 707/3 |
| 2002/0103798 A1 | 8/2002 | Zheng et al. | 707/5 |
| 2002/0107861 A1 | 8/2002 | Clendinning et al. | 77/101 |
| 2002/0107886 A1 | 8/2002 | Gentner et al. | 707/511 |
| 2002/0129014 A1 | 9/2002 | Kim et al. | 707/5 |
| 2002/0169595 A1 | 11/2002 | Agichtein et al. | 704/9 |
| 2002/0169770 A1 | 11/2002 | Kim et al. | 707/5 |
| 2003/0037074 A1 | 2/2003 | Dwork et al. | 707/500 |
| 2003/0053084 A1 * | 3/2003 | Geidl et al. | 358/1.6 |
| 2003/0055810 A1 | 3/2003 | Cragun et al. | 707/1 |
| 2003/0061201 A1 | 3/2003 | Grefenstette et al. | 707/3 |
| 2003/0065706 A1 | 4/2003 | Smyth et al. | 709/200 |
| 2003/0074368 A1 | 4/2003 | Schuetze et al. | 707/103 R |
| 2003/0208482 A1 | 11/2003 | Kim et al. | 707/3 |
| 2003/0217007 A1 * | 11/2003 | Fukushima et al. | 705/51 |
| 2003/0217047 A1 | 11/2003 | Marchisio | 707/3 |
| 2003/0217052 A1 | 11/2003 | Rubenczyk et al. | 707/3 |
| 2004/0003028 A1 * | 1/2004 | Emmett et al. | 709/203 |
| 2004/0006559 A1 | 1/2004 | Gange et al. | 707/3 |
| 2004/0049766 A1 | 3/2004 | Bloch et al. | 717/121 |
| 2004/0093328 A1 | 5/2004 | Damle | 707/3 |
| 2004/0117351 A1 | 6/2004 | Challapalli et al. | 707/2 |
| 2004/0148278 A1 | 7/2004 | Milo et al. | 707/3 |
| 2004/0181515 A1 | 9/2004 | Ullmann et al. | 707/3 |
| 2004/0186827 A1 | 9/2004 | Anick et al. | 707/3 |
| 2004/0194099 A1 | 9/2004 | Lamping et al. | 718/100 |
| 2004/0199497 A1 * | 10/2004 | Timmons | 707/3 |
| 2004/0205497 A1 | 10/2004 | Alexander et al. | 715/501.1 |
| 2004/0215606 A1 | 10/2004 | Cossock | 707/3 |
| 2004/0215664 A1 | 10/2004 | Hennings et al. | 707/104.1 |
| 2004/0254932 A1 * | 12/2004 | Gupta et al. | 707/7 |
| 2005/0033742 A1 | 2/2005 | Kamvar et al. | 707/7 |
| 2005/0044071 A1 * | 2/2005 | Cho et al. | 707/3 |
| 2005/0055340 A1 | 3/2005 | Dresden | 707/3 |
| 2005/0055347 A9 * | 3/2005 | Cho et al. | 707/5 |
| 2005/0060186 A1 * | 3/2005 | Blowers et al. | 705/2 |
| 2005/0060304 A1 * | 3/2005 | Parikh | 707/3 |
| 2005/0060311 A1 | 3/2005 | Tong et al. | 707/1 |
| 2005/0071328 A1 | 3/2005 | Lawrence | 707/3 |

| | | | |
|---|---|---|---|
| 2005/0071741 A1 | 3/2005 | Acharya et al. | 715/500 |
| 2005/0086192 A1 | 4/2005 | Kodama | 707/1 |
| 2005/0086206 A1 | 4/2005 | Balasubramanian et al. | 707/3 |
| 2005/0086583 A1 | 4/2005 | Obata et al. | 715/229 |
| 2005/0144162 A1 | 6/2005 | Liang | 707/3 |
| 2005/0154746 A1 | 7/2005 | Liu et al. | 707/101 |
| 2005/0165781 A1 | 7/2005 | Kraft et al. | 707/7 |
| 2005/0187965 A1* | 8/2005 | Abajian | 707/102 |
| 2005/0192936 A1 | 9/2005 | Meek et al. | 707/3 |
| 2005/0192955 A1 | 9/2005 | Farrell | 707/5 |
| 2005/0210006 A1 | 9/2005 | Robertson | 707/3 |
| 2005/0216533 A1 | 9/2005 | Berkhin | 707/204 |
| 2005/0240580 A1 | 10/2005 | Zamir et al. | 707/4 |
| 2005/0251499 A1 | 11/2005 | Huang | 707/1 |
| 2005/0262050 A1 | 11/2005 | Fagin et al. | 707/3 |
| 2005/0283473 A1* | 12/2005 | Rousso et al. | 707/5 |
| 2006/0036598 A1 | 2/2006 | Wu | 707/5 |
| 2006/0047649 A1 | 3/2006 | Liang | 707/4 |
| 2006/0173560 A1 | 8/2006 | Widrow | 700/48 |
| 2006/0195440 A1 | 8/2006 | Burges et al. | 707/5 |
| 2006/0206460 A1 | 9/2006 | Gadkari et al. | 707/3 |
| 2006/0206476 A1 | 9/2006 | Kapur et al. | 707/5 |
| 2006/0282455 A1 | 12/2006 | Lee et al. | 707/102 |
| 2006/0287993 A1 | 12/2006 | Yao et al. | 707/4 |
| 2007/0038616 A1* | 2/2007 | Guha | 707/4 |
| 2007/0038622 A1 | 2/2007 | Meyerzon et al. | 705/5 |
| 2007/0073748 A1 | 3/2007 | Barney | 707/101 |
| 2007/0106659 A1 | 5/2007 | Lu et al. | 707/7 |
| 2007/0150473 A1 | 6/2007 | Li et al. | 707/7 |
| 2007/0276829 A1* | 11/2007 | Wang et al. | 707/7 |
| 2009/0106221 A1 | 4/2009 | Meyerzon et al. | 707/5 |
| 2009/0106223 A1 | 4/2009 | Meyerzon et al. | 707/5 |
| 2009/0106235 A1 | 4/2009 | Tankovich et al. | 707/5 |

FOREIGN PATENT DOCUMENTS

| | | |
|---|---|---|
| EP | 0950961 A3 | 10/1999 |
| EP | 1050830 A2 | 11/2000 |
| EP | 1120717 A2 | 8/2001 |
| EP | 1282060 A2 | 2/2005 |
| EP | 1557770 A1 | 7/2005 |
| JP | 10091638 | 4/1998 |
| JP | 11328191 | 11/1999 |
| JP | 2002-091843 | 3/2002 |
| JP | 2003-248696 | 9/2003 |
| KR | 10-2002-0015838 A | 3/2002 |
| KR | 10-2003-0082109 A | 10/2003 |
| KR | 10-2006-0116042 A | 11/2006 |

OTHER PUBLICATIONS

Carmel, D. et al., "Searching XML Documents Via XML Fragments", SIGIR Toronto, Canada, Jul.-Aug. 2003, pp. 151-158.
Craswell, N. et al., "TREC12 Web Track as CSIRO", TREC 12, Nov. 2003, 11 pp.
Cutler, M. et al., "A New Study on Using HTML Structures to Improve Retrieval", 11th IEEE International Conference on Chicago, IL, Nov. 9-11, 1999, pp. 406-409.
Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.
Fagin, R. et al., "Searching the Workplace Web", IBM Almaden Research Center, In Proceedings of the Twelfth International World Wide Web Conference, Budapest, 2003, 21 pgs.
Hawking, D. et al., "Overview of the TREC-8 Web Track", TREC, Feb. 2000, pp. 1-18.
Hawking, D., "Overview of the TREC-9 Track", TREC, 2000, pp. 1-16.
Hawking., D. et al., "Overview of TREC-7 Very Large Collection Track", TREC, Jan. 1999, pp. 1-13.
Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.
Jones, K. et al., "A probabilistic model of information retrieval: development and status", Department of Information Science, City University, London, Aug. 1998, 74 pgs.
Kotsakis, E., "Structured Information Retrieval in XML Documents", Proceedings of the ACM Symposium on Applied Computing, Madrid, Spain, 2002, pp. 663-667.
Lalmas, M., "Uniform Representation of Content and Structure for Structured Document Retrieval", $20^{th}$ SGES International Conference on Knowledge Based Systems and Applied Artificial Intelligence, Cambridge, UK, Dec. 2000, pp. 1-12.
Losee, R. et al., "Research in Information Organization", Literature Review, School of Information and Library Science, Section 4, pp. 53-96, Jan. 2001.
Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.
Numerico, T., "Search engines organization of information and Web Topology", http://www.cafm.lsbu.ac.uk/eminars/sse/numerico-6-dec-2004.pdf, Dec. 6, 2004, 32 pgs.
Ogilvie, P. et al., "Combining Document Representations for Known-Item Search", Proceedings of the $26^{th}$ Annual International ACM SIGIR Conference on Research and Development in Information Retrieval, Toronto, Canada, 2003, pp. 143-150.
Robertson, S. et al., "Okapi at TREC-4", 1996, 24 pp.
Robertson, S. et al., "Some Simple Effective Approximations to the 2-Poisson Model for Probabilistic Weighted Retrieval", Proceedings of the $17^{th}$ Annual International ACM SIGIR Conference on Research and Development in Information Retrieval, 1994, pp. 232-241.
Singhal, A. et al., "AT&T at TREC-9", Proceedings of the Ninth Text Retrieval Conference, NIST Special Publication 500-249, 'Online! 2001, pp. 103-105.
Voorhees, E., "Overview of TREC 2002", Gaithersburg, Maryland, Nov. 19-22, 15 pp.
Web Page "Reuters: Reuters Corpus", http://about.reuter.com/researchandstandards/corpus/, viewed Mar. 18, 2004.
Westerveld, T. et al., "Retrieving Web pages using Content, Links, URLs and Anchors", Proceedings of the Tenth Text Retrieval Conference, NIST Special Publication, 'Online! Oct. 2001, pp. 1-10.
Wilkinson, R., "Effective Retrieval of Structured Documents", Annual ACM Conference on Research and Development, 1994, 7 pp.
Zamir, O. et al., "Grouper: A Dynamic Clustering Interface to Web Search Results", Computer Networks (Amsterdam, Netherlands: 1999), 31(11-16): 1361-1374, 1999.
"Microsoft SharePoint Portal Server 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pp.
"Microsoft Full-Text Search Technologies", http://www.microsoft.com/technet/prodtechnol/sppt/sharepoint/evaluate/featfunc/ms-searc..., published on Jun. 1, 2001, printed on May 22, 2006, 13 pp.
"Microsoft External Content in Microsoft Office SharePoint Portal Server 2003", http://www.microsoft.com/technet/prodtechnol/sppt/reskit/c2261881x.mspx, published on Jun. 9, 2004, printed on May 22, 2006, 20 pp.
"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pp.
Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.
"SharePoint Portal Server 2001 Planning and Installation Guide", http://www.microsoft.com/technet/prodtechnol/sppt/sharepoint/plan/planinst.mspx, printed on May 22, 2006, 86 pp.
Nelson, Chris, IEEE, "Use of Metadata Registries for Searching for Statistical Data", 0-7695-1632-7/02 2002, pp. 232-235.

Yi, et al., WebDB 2000, LNCS 1997, "Using Metadata to Enhance Web Information Gathering", 2001, pp. 38-57.

Heery, Rachel, "Review of Metadata Formats", *Program*, vol. 30, No. 4, Oct. 1996, *1996 IEEE*, pp. 345-373.

Kucuk, Mehmet Emin, et al., "Application of Metadata Concepts to Discovery of Internet Resources", *ADVIS 2000, INCS 1909*, pp. 304-313, 2000.

Larkey, Leah S., et al., "Collection Selection and Results Merging with Topically Organized U.S. Patents and TREC Data", *Proceedings of the Ninth International Conference on Information Knowledge Management, CIKM 2000*, Nov. 6-11, 2000, pp. 282-289.

Nelson, Chris, "Use of Metadata Registries for Searching for Statistical Data", *IEEE 2002, Dimension EDI Ltd.*, pp. 232-235, 2002.

Schulz, Stefan, et al., "Indexing Medical WWW Documents by Morphemes", *MEDINFO 2001 Proceedings of the 10$^{th}$ World Congress on Medical Informatics, Park I*, IOS Press, Inc., pp. 266-270, 2001.

Sturdy, Derek, "Squirrels and nuts: metadata and knowledge management", *Business Information Review*, 18(4), pp. 34-42, Dec. 2001.

Yi, Jeonghe,e et al., "Metadata Based Web Mining for Topic-Specific Information Gathering", *IEEE*, pp. 359-368, 2000.

Yi, Jeonghee, et al., "Using Metadata to Enhance Web Information Gathering", D.Suciu and G. Vossen (eds.): *WebDB 2000, LNCS 1997*, pp. 38-57, 2001.

Najork, Marc et al., "Breadth-First Crawling Yields High-Quality Pages", ACM, Compaq Systems Research Center, Hong Kong, 2001, pp. 114-118.

Cho et al., "Efficient Crawling Through URL Ordering", In Proceedings of the 7th International World Wide Web Conference, Apr. 1998, pp. 161-180.

Chakrabarti, S., "Recent Results in Automatic Web Resource Discovery", ACM Computing Surveys, vol. 31, No. 4es, Dec. 1999, pp. 1-7.

Lam et al., "Automatic Document Classification Based on Probabilistic Reasoning: Model and Performance Analysis", IEEE, 1997, pp. 2719-2723.

Lee, J.K.W. et al., "Intelligent Agents for Matching Information Providers and Consumers on the Worl-Wide Web", IEEE, 1997, pp. 189-199.

Huang et al., "Design and Implementation of a Chinese Full-Text Retrieval System Based on Probabilistic Model", IEEE, 1993, pp. 1090-1093.

Yuwono, Budi and Lee, Dik L., "Search and Ranking Algorithms for Locating Resources on the World Wide Web", IEEE, 1996, pp. 164-170.

Chen, Michael et al., Cha Cha, "A System for Organizing Intranet Search Results", Computer Science Department, University of California, Berkeley, 1999, pp. 1-12.

U.S. Appl. No. 09/493,748, filed Jan. 28, 2000 entitled "Adaptive Web Crawling Using a Statistical Model".

PCT Search Report in PCT/US2008/011894 mailed Feb. 27, 2009.

Senecal, Sylvain, "Consumers' Decision-Making Process and Their Online Shopping Behavior: A Clickstream Analysis", Jun. 1, 2004, pp. 1600-1607.

Fagin, Ronald, "Searching the Workplace Web", Mar. 3, 2005, pp. 366-375.

Wen, Jl-Rong, "Query Clustering Using User Logs", Jan. 2002, pp. 59-81.

Agichten et al., "Improving Web Search Ranking by Incorporating User Behavior Information"—http://www.mathcs.emory.edu/~eugene/papers/sigir2006ranking.pdf, 8 pp.

Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&dl=GUIDE&CFID=22810237&CFTOKEN=34449120, pp. 585-593.

Burges, Christopher J.C. et al. "Learning to Rank with Nonsmooth Cost Functions"—http://books.nips.cc/papers/txt/nips19/NIPS2006_0574.txt, 2 pp.

Filip Radlinski, et al.,, "Query Chains: Learning to Rank from Implicit Feedback," http://delivery.acm.org/10.1145/1090000/1081899/p239-248.radlinski.pdf?key1=1081899&key2=3628533811&coll=GUIDE& CFID=27212902&CFTOKEN=53118399, *KDD'*05, Chicago, IL, Aug. 21-24, 2005, 10 pages.

Irina Matveeva, et al., "High Accuracy Retrieval with Multiple Nested Ranker," http://people.cs.uchicago.edu/~matveeva/RankerSIGIR06.pdf, *SIGIR'*06, Seattle, WA Aug. 6-11, 2006, 8 pages.

Gui-Rong Xue, et al., "Optimizing Web Search Using Web Click-Through Data," http://people.cs.vt.edu/~xwensi/Publication/p118-xue.pdf, *CIKM'*04, Nov. 8-13, 2004, 9 pages.

Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.

Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.

Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.

MSDN, "Understanding Ranking," http://msdn.microsoft.com/en-us/library/ms142524.aspx, Sep. 2007, 4 pages.

Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.

PCT Search Report in PCT/US2006/031965 mailed Jan. 11, 2007.

Chen, Hsinchun et al., "A Smart Itsy Bitsy Spider for the Web", Journal of the American Society for Information Science, 49(7), 1998, pp. 604-618.

Kleinberg, Jon M., "Authoritative Sources in a Hyperlinked Environment", Proceedings of the aCM-SIAM symposium on Discrete Algorithms, 1998, 34 pp.

U.S. Official Action in U.S. Appl. No. 10/955,983 mailed Jun. 10, 2009.

U.S. Official Action in U.S. Appl. No. 11/412,723 mailed Sep. 3, 2009.

U.S. Official Action in U.S. Appl. No. 11/073,381 mailed Sep. 29, 2009.

Chinese First Official Action in 200680029645.1 mailed Jun. 19, 2009.

Chinese First Official Action in 200680035828.4 mailed Jun. 19, 2009.

Chinese Third Official Action in 200510088213.5 mailed Sep. 4, 2009.

Japanese Notice of Rejection in 2008-527094 mailed Sep. 11, 2009.

* cited by examiner

RANKING SEARCH RESULTS USING FEATURE EXTRACTION

FIELD OF THE INVENTION

The present invention generally relates to ranking search results according to relevance to a search request. More particularly, the present invention relates to ranking search results using feature extraction.

BACKGROUND OF THE INVENTION

In the modern computing world, users routinely enter search requests into a variety of search engines for receiving help functionality, research materials, documents related to a given task, and the like. A well-known use of search engines in modern times is the use of a variety of search engines for obtaining one or more Universal Resource Locators (URL) associated with IInternet-based information. For example, a user may use a search engine to search the Internet for all topics related to a given history topic or other research topic.

In response to such searches, hundreds or even thousands of search results, including URLs, documents or other resources, may be located across vast arrays of information sources that are responsive to the user's search request. Efforts have been made for ranking the search results and providing the search results to the user in the order of relevance to the given search request. Prior methods have attempted to obtain various properties from located resources and for using those properties to determine a ranking of the relevance of individual resources to a user's request. Often, metadata associated with various resources, for example, documents and URLs, is incorrect or misleading. Incorrect data used by a ranking system leads to a poor ranking of the search results. Consequently, a user may be forced to review a number of irrelevant resources before the user comes to more relevant resources located during the search.

Accordingly, there is a need for an improved method for ranking search results using a property extraction feature. It is with respect to these and other considerations that the present invention has been made.

SUMMARY OF THE INVENTION

Embodiments of the present invention solve the above and other problems by providing a method of ranking search results using feature extraction data. According to an embodiment of the present invention, upon receipt of a search request by a search engine, a database of information, such as Internet-based information sites, is searched for information responsive to the search request. Each located document or other resource is parsed to obtain data, such as text, formatting information, metadata, and the like. In accordance with an embodiment of the present invention, text and data from the located documents or resources are passed through a feature extraction application to extract properties of the text or data that may be used to improve a ranking of the search results based on relevance of the search results to the user's request.

According to a particular embodiment, while a search engine may obtain certain types of information including document or resource titles from defined sources such as metadata, the feature extraction application extracts titles of each located document or resource from document or resource content based on formatting applied to the document or resource. Text, data, and extracted properties, such as resource titles and associated statistical information, are indexed. A ranking application is then run on the indexed text, data, and extracted properties for determining a ranking value for each located resource based on its relevance to the search request. The ranking application uses the extracted properties, such as titles, to augment other data passed to the ranking application, including indexed text, data from an associated document or resource. Ranked search results may then be displayed to the user.

These and other features and advantages, which characterize the present invention, will be apparent from a reading of the following detailed description and a review of the associated drawings. It is to be understood that both the foregoing general description and the following detailed description are exemplary and are explanatory only and are not restrictive of the invention as claimed.

DETAILED DESCRIPTION

As briefly described above, embodiments of the present invention are directed to methods and computer-readable media for ranking search results using feature extraction data. Each of the results of a search engine query is parsed to obtain data, such as text, formatting information, metadata, and the like. The text, the formatting information and the metadata are passed through a feature extraction application to extract data that may be used to improve a ranking of the search results based on relevance of the search results to the search engine query. According to one embodiment, the feature extraction application extracts titles from text and data contained in located documents or resources based on formatting properties applied to or associated with the document or resource. The extracted titles, the text, the formatting information and the metadata for any given search results item are processed according to a ranking algorithm application for determining a ranking of the given search results item. Ranked search results items may then be displayed according to ranking. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
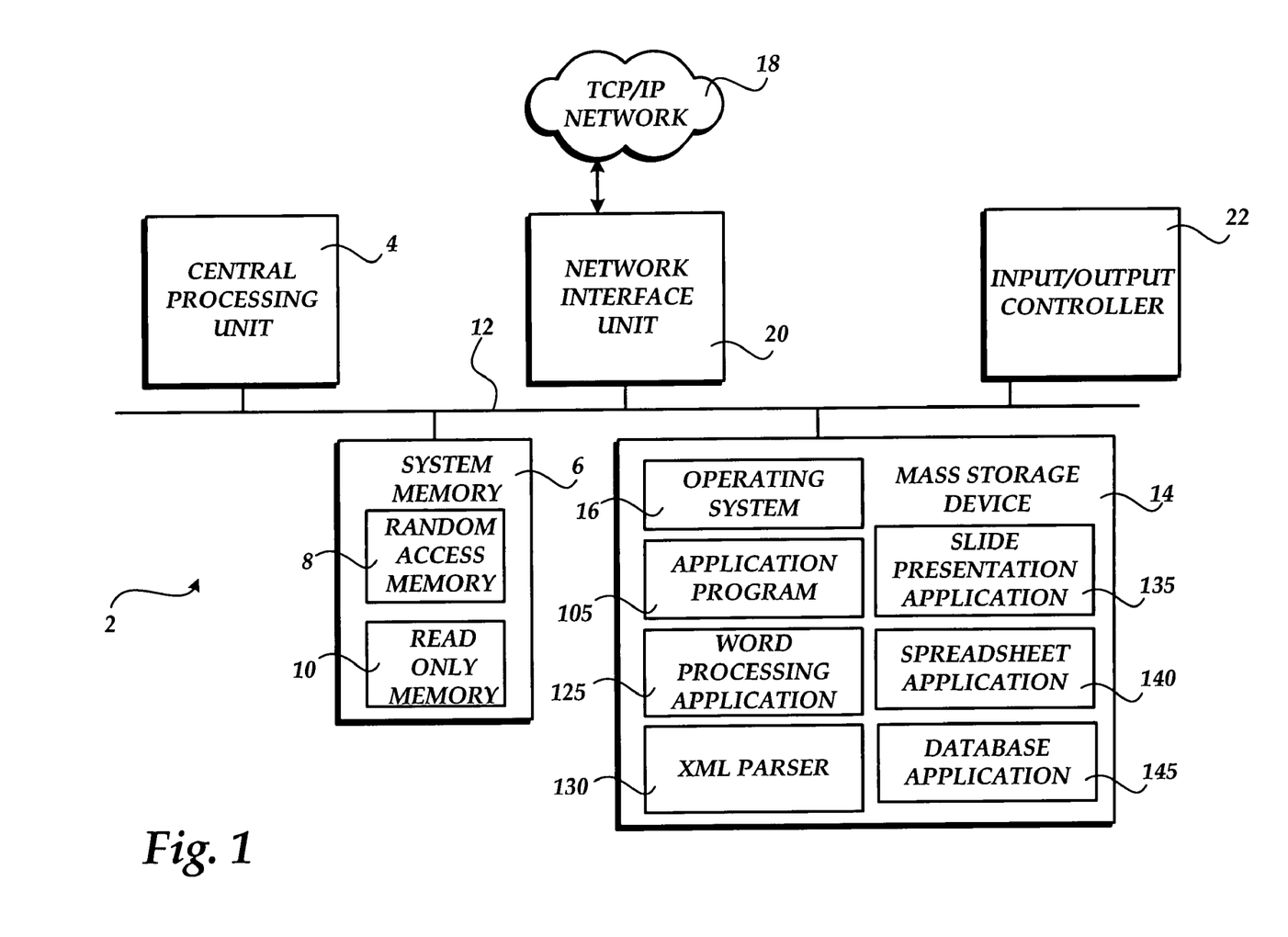
FIG. 1 is a block diagram showing the architecture of a personal computer that provides an illustrative operating environment for embodiments of the present invention.

Referring now to the drawings, in which like numerals refer to like elements through the several figures, aspects of the present invention and an exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 105, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application, a spreadsheet application, a desktop publishing application, and the like. According to an embodiment of the present invention, the application program 105 comprises a multiple functionality software application suite for providing functionality from a number of different software applications. Some of the individual program modules that may comprise the application suite 105 include a word processing application 125, a slide presentation application 135, a spreadsheet application 140 and a database application 145. An example of such a multiple functionality application suite 105 is OFFICE manufactured by Microsoft Corporation. Other software applications illustrated in FIG. 1 include an Extensible Markup Language (XML) parser 130.

Figure 2:
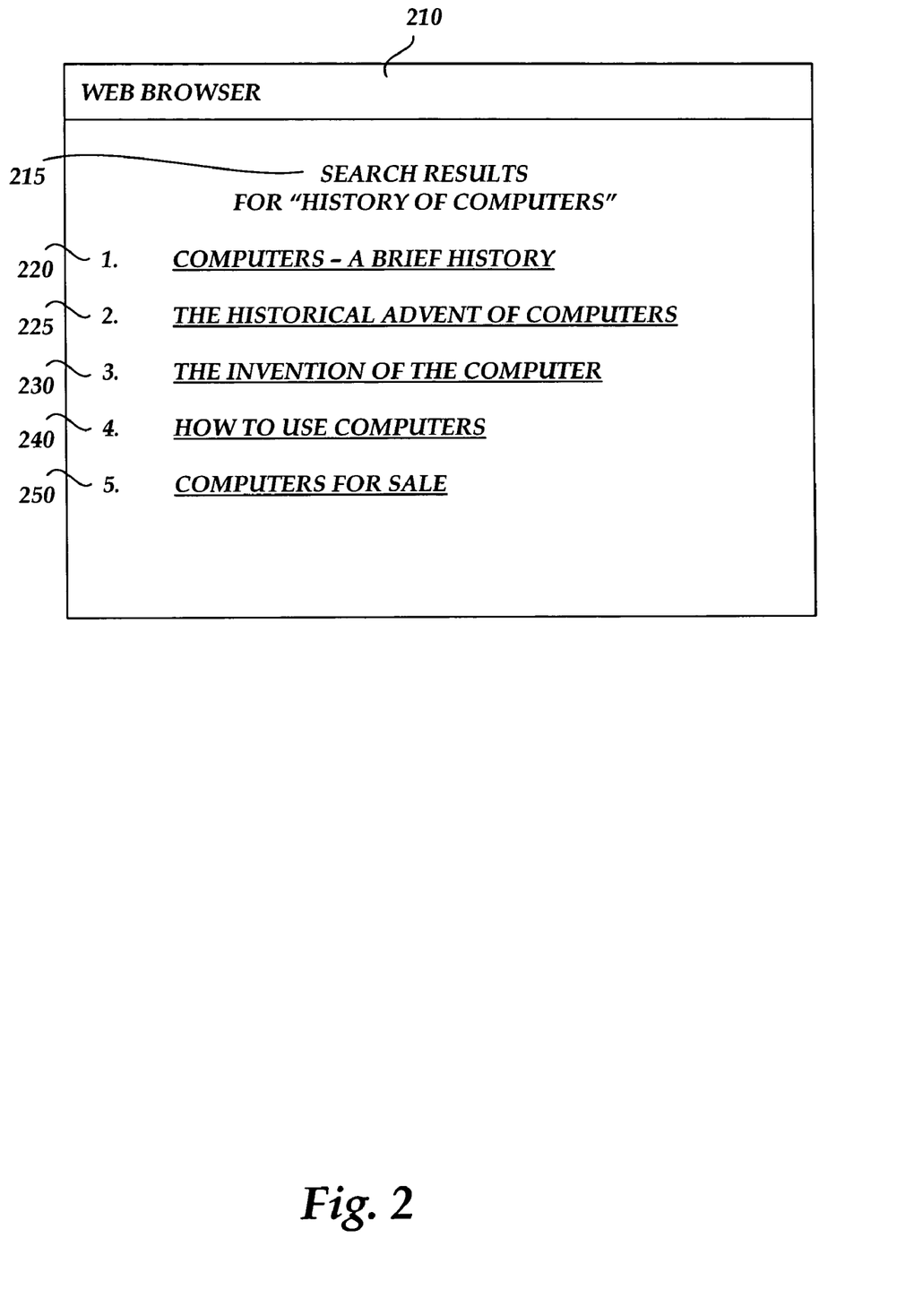
FIG. 2 illustrates a computer screen display showing an Internet browsing application user interface for displaying search results ranked according to relevance to a user's search request.

Referring now to FIG. 2, an illustrative Internet browser user interface 200 is illustrated. According to the example user interface 200, a user has entered a search request of "history of computers." Once the entered search request is submitted to a search engine selected by the user, the search engine searches available Internet-based resources for documents, URLs, or other resources responsive to the user's search request. According to embodiments of the present invention, the located documents, URLs, or other resources, are ranked according to their relevance to the user's entered search request. For example, as illustrated in FIG. 2, responses to the user's search request are ranked in order of 1 to 5 where the first displayed result is ranked as the most relevant search result responsive to the user's request. For example, the first ranked search result includes a title of an article "Computers—A Brief History." As illustrated in FIG. 2, the least relevant search result includes an example article or advertisement entitled "Computers For Sale."

As should be understood by those skilled in the art, the example search request and search results illustrated in FIG. 2 are for purposes of example only and are not restrictive of the invention as claimed. Similarly, as should be understood, embodiments of the present invention may be directed to search engines for searching a variety of information resources other than Internet-based information sources. For example, a search engine may be utilized by a company or other organization for searching documents, articles, and the like, located on a company information store or database.

Figure 3:
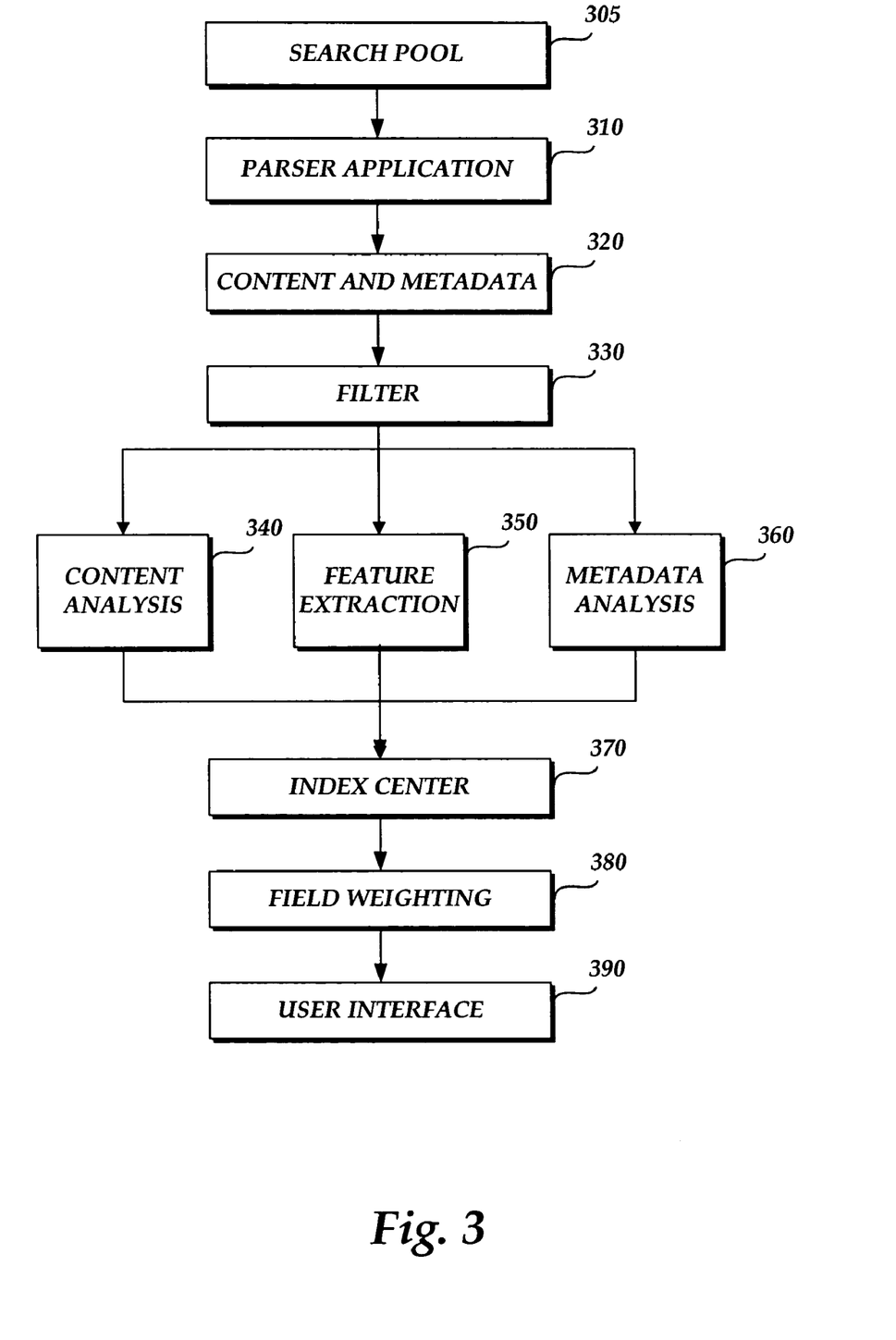
FIG. 3 is a simplified block diagram illustrating a system architecture for ranking search results using a feature extraction according to embodiments of the present invention.

FIG. 3 is a simplified block diagram illustrating a system architecture for ranking search results using a feature extraction application according to embodiments of the present invention. A search pool 305 is illustrative of an information store, database, or other location, which may be searched by a search engine for search results responsive to a user-entered search request or query. As should be understood by those skilled in the art, a typical search engine parses a user's entered search request and utilizes the terms and phrases parsed from a user's search request for searching various information stores and databases for information responsive to the search request. As understood by those skilled in the art, a search engine builds an index of information contained in a given document or resource, as described below. Then, in response to a query, the contents of the index for each associated document or resource are searched by the search engine and are ranked for display, as described herein.

Documents, URLs, and other resources searched by a search engine contain various information including text, data, and metadata. Metadata for a given resource may include such items as a title, an author's name, a date of resource creation, or information about an organization responsible for the resource. Utilizing terms and phrases parsed from a search request, a search engine locates matching terms or phrases in the text, data, or metadata of documents, resources, or URLs available in searched information sources or databases. A parser application 310 is illustrated for parsing each of a plurality of search results items into one or more portions of data and associated formatting information applied to the one or more portions of data, as well as, parsing the results of the search engine request into pieces of content and metadata. For example, parser application 310 may be in the form of a web crawler application and may parse an Internet-based resource into individual content pieces and metadata. For example, if the metadata of the resource includes a title, an author's name, identification information about the resource, and the like, the parser application 310 may parse that information into separate pieces of data or content. Content from other portions of a given resource may also be parsed by the web crawler application. For example, properties of a document may be obtained from parsing a storage file associated with a located search item, for example, a Hypertext Markup Language (HTML) header or body section. For a detailed discussion of the operation of a web crawling application, described herein, see U.S. patent application Ser. No. 10/609,315, Jun. 27, 2003, entitled "Normalizing Document Metadata Using Directory Services," which is incorporated herein by reference as if fully set out herein and U.S. patent application Ser. No. 09/493,748, filed Jan. 28, 2000, entitled "Adaptive Web Crawling Using A Statistical Model," which is incorporated herein by reference as if fully set out herein.

In addition, other text and data in a given resource may be parsed into individual terms or phrases by the parser application. As should be understood by those skilled in the art, for other types of search engine results, other types of parsing applications may be utilized. For example, a document parser, for example an XML parser 130, may be utilized for parsing documents from a company or entity document storage site for individual text items, phrases, and metadata in the documents that may be useful for ranking search results obtained by the search engine.

Often, metadata of individual documents or other resources can be incorrect, missing or misleading. For example, information may be located in the metadata of a given Internet-based resource that is indicative of a title of a document, but the information may be incorrect. In addition, text or data located in the general content of the document may be ambiguous, misleading, or otherwise difficult to parse and to understand in terms of its relevance to a given search request. Referring still to FIG. 3, once content and metadata are parsed from located documents, resources, or URLs, the parsed content and metadata are passed through a filter application 330 for passing the parsed content and metadata to one or more analysis plug-ins or applications for characterizing the data and for passing the data to an index center 370. For example, metadata taken from a metadata location of an Internet-based resource may be passed to a metadata analysis application 360 for comparison against known metadata items for a determination of the applicability of the metadata for use in ranking associated search results.

Other content, for example, text and data, may be passed to a content analysis application 340 for similar analysis. For example, a content analysis application 340 may be utilized for characterizing certain text or data for eventual use in ranking associated search results. For example, a content analysis application 340 may compare words parsed from the text of a document or resource against a database of known words that have been previously characterized. For example, referring to the example search results contained in FIG. 2, the phrase "For Sale," illustrated in the fifth search result may be compared against a database of terms, and a determination may be made that the term is relevant to advertising materials, for example.

According to an embodiment of the present invention, content and metadata parsed from located documents, resources, and URLs are passed to a feature extraction application for extracting specified information from the located resources. According to a particular embodiment of the present invention, the feature extraction application 350 is utilized for extracting titles from located resources, documents, or URLs. As should be understood by those skilled in the art, a title of a given document, resource or URL, is a very valuable piece of information for ranking a given search result for its relevance to a search request. For example, referring to FIG. 2, the first ranked resource bares a title of "Computers—A Brief History." As can be understood, such a title may have a strong relevance to the search request of "history of computers" entered by the user. Accordingly, use of extracted titles from located resources, documents and URLs is of high value to a ranking system for determining a ranking of search results relative to an associated search request or query.

According to embodiments of the present invention, an exemplary feature extraction application for extracting titles from located resources parses data contained in the resource for determining which text or data is associated with a title. For example, formatting information applied to certain text or data in a document, the location of certain text or data in a document, spacing between certain text or data a document, and the like, may be used by a feature extraction application for extracting a title from a given resource. For example, historical data may indicate that a phrase located at the top of a document or resource set apart from other content of the document or resource and formatted according to certain formatting properties, for example, bold formatting, underlining, and the like, may indicate that the phrase is a title. For another example, words or phrases located after certain introductory words, such as "Re:," "Subject," "Title," and the like, may indicate that a word or set of words or data immediately following such terms or phrases is a title. According to embodiments of the present invention, such formatting information (font size, style, alignment, line numbers, etc) are passed to a classification algorithm of the extraction feature application that attempts to classify each fragment of text or data passed through the extraction feature as a potential beginning and ending of a particular feature such as a title. Once a beginning point and an ending point are determined as including a given feature, such as a title, a weighting may be applied to the determined text or data to further identify the determined text or data as a particular feature, such as a title. Once a given text or data fragment is determined as a particular feature, that text or data fragment may be indexed for ranking, as described below.

In addition to extracting titles from data passed through the feature extraction application, statistical information is extracted for each extracted title that provides a number of and frequency of appearance of a the extracted title in the data. As should be understood, other types of data in addition to titles may be extracted from a text or data selection for use in accordance with the present invention for augmenting the performance of a ranking application such as the field weighting algorithm described below.

Referring still to FIG. 3, once analysis of the parsed content and metadata obtained from search results items is passed through the analysis applications, including the feature extraction application 350, each word, phrase, or data item, identified by the one or more analysis applications 340, 350, 360, is passed to an index center 370 for indexing in association with a given search results item. For example, according to embodiments of the present invention, any word or phrase extracted as a title from a document or resource by the feature extraction application 350 is passed to the index center 370 as an extracted title. That is, the extracted word or phrase is indexed in the same manner as would be a word or phrase that has been identified with certainty as a title associated with a given document, resource, or URL. However, as should be understood, a given document or resource may have a text item actually identified as a title of the document or resource. According to embodiments of the invention, both such "actual" titles and any extracted titles are used by the ranking algorithm for ranking search results, as described herein. The extracted titles serve to augment other information provided to the ranking algorithm.

Extracted titles and associated statistical information, words, phrases, data, and the like, indexed for a given search results item are passed to a field weighting application 380 for generation of a ranking value for the associated search results item based on its relevance to the search request. The following represents an example scoring or ranking algorithm for ranking a given search result based on indexed data obtained or extracted from a given search results item.

$$\sum \frac{wtf(k_1+1)}{k_1\left((1-b)+b\frac{wdl}{avwdl}\right)+wtf} \times \log\left(\frac{N}{n}\right)$$

According to this algorithm, "Wtf" means weighted term frequency which is a sum of term frequencies of a given term multiplied by weights across all properties. According to embodiments, statistical analysis weighting may be applied to various terms for use in the algorithm. For example, articles like "and" and "the" may be given low weights so those terms will not adversely affect ranking of a given search item. "Wdl" means weighted document length. "Avwdl" means average weighted document length. "N" means number of documents in the corpus or body of documents or resources located in the search. The lower case "n" means the number of documents containing the given query term and the sum is across all query terms. The variables "k1" and "b" are constants. As should be understood, the ranking algorithm described above is one example of such and algorithm. For a detailed description of the operation of a field weighting ranking/scoring function, as described herein, see U.S. patent application Ser. No. 10/804,326, filed Mar. 18, 2004, entitled "Field Weighting In Text Document Searching," which is incorporated herein by reference as if fully set out herein.

Other suitable ranking algorithms may be used for generating ranking values for search results based on a content, metadata and extracted features of a given document or resource. For example, according to a particular embodiment, the algorithm cited above may be modified by removing the expression "(1−b)+b dl/avdl." This expression is a length normalization factor that is incorporated into wtf variable. According to this embodiment, independent length normalization is used for each property. WTF becomes a weighted sum of term frequencies normalized by length. Extracted features (e.g., titles) and associated statistical information are included in the weighted sum of term frequencies, illustrated in the algorithm above, as one of the non-zero weight properties. The extracted titles and associated statistical information serve to augment the performance of the ranking algorithm for generating more accurate and reliable rankings for individual search results items. As should be understood, other types of data, in addition to titles, for example, names, dates, locations, and the like, may be extracted by a feature extraction application for augmenting the performance of the field weighting application. Once the field weighting ranking/scoring function is run using the indexed data obtained or extracted from an associated search results item, a numerical value is assigned to the associated search results item in terms of its relevance to the associated search request.

Referring still to FIG. 3, a user interface 390 displays the search results based on the ranking value applied to each search result. That is, the search result having the highest ranking is displayed first, the search result having the next highest ranking is displayed next, the search result having the next highest ranking is displayed next, and so on.

Figure 4:
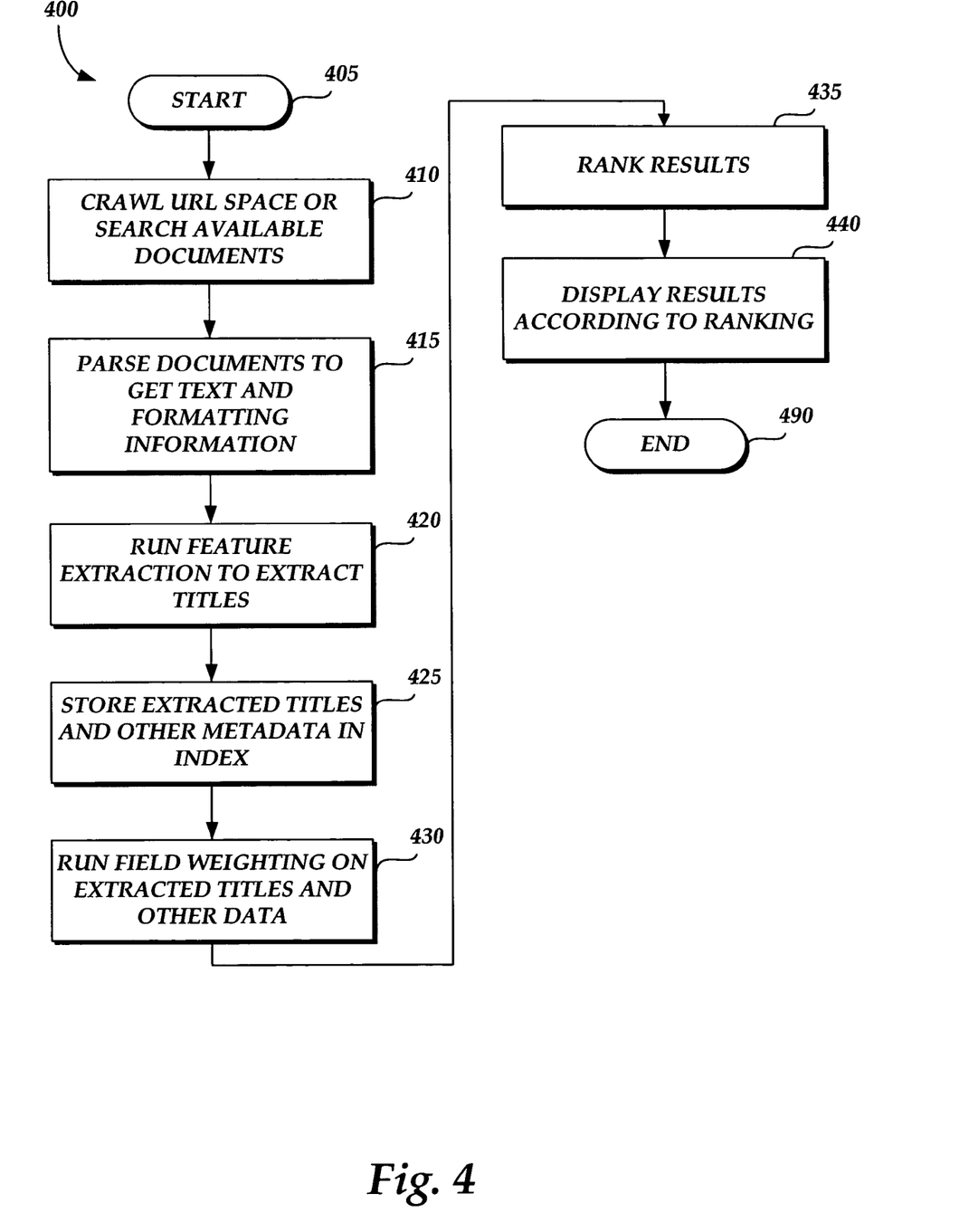
FIG. 4 is a flow diagram illustrating steps performed by a method and system of the present invention for ranking search results using feature extraction according to embodiments of the present invention.

Having described components of a system for ranking search results using properties extracted by a feature extraction application with respect to FIG. 3, FIG. 4 is a flow diagram illustrating steps performed by a routine of the present invention for ranking search results using feature extraction data according to embodiments of the present invention. The routine 400 begins as start block 405 and proceeds to block 410 where a given URL space associated with an Internet-based information site or sites is crawled by a web crawler 310 for locating documents, resources, URLs, and the like, responsive to a user's search request. Similarly, a search engine for searching documents in a company or other organization resource storage location may be utilized.

At block 415, documents or other resources obtained by the search engine are parsed to obtain text, data, formatting information, metadata, and the like. At block 420, text, content, metadata, and other data parsed from obtained documents or resources are passed to one or more analysis applications 340, 350, 360. In particular, according to embodiments of the present invention, a feature extraction application 350 is run against text, data, and metadata parsed from a given search results item to extract titles from the associated search request items. At block 425, extracted titles and other text, data and metadata are indexed in an index center 370, described above.

At block 430, in response to a search request, the search engine searches the index for information responsive to the request. Information responsive to the request, including extracted titles and other text, data and metadata, is passed to the ranking algorithm, as described above. At block 435, ranking values are generated by the ranking algorithm application for each search results item. At block 440, the results of the user's search request are displayed according to the ranking values applied to each search results item by the field weighting application. According to embodiments, the steps described above may be performed according to different orders. For example, according to one embodiment, the index is built for a variety of documents or resources in a given information source. Then, at query time, the search engine searches the index and ranks the results using the ranking algorithm.

As described herein, methods and systems are provided for ranking search results using feature extraction data. According to a particular embodiment, titles are extracted from documents, resources, URLs, and the like located by a search engine in response to a user search request. The extracted titles are utilized along with other metadata and information parsed from a given search request item by a field weighting application for applying a ranking to a given search request item. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method, comprising:
receiving on a computing device resource items generated by a search engine in response to a search request;
parsing each of the resource items to obtain data, wherein the data includes: text, formatting information and metadata;
passing the data for each of the resource items that includes the text, the formatting information and the metadata through a feature extraction application for determining applicability of the obtained metadata by comparing the obtained metadata against known metadata for use in ranking search results; comparing words parsed from the text that is separate from the obtained metadata against a database of known words that have been previously characterized; using formatting characteristics of the data to determine when to extract a title from the resource item; wherein the formatting characteristics that are used include: a bold formatting characteristic; an underlining formatting characteristic; wherein the feature extraction application stores statistical information for each extracted title that provides a number of and a frequency of appearance of the extracted title in the data; and extracting features from the one or more portions for each of the resource items;
passing extracted features through a ranking application for generating a ranking value for each of the resource items based on a relevance of each of the resource items to the search request; and
generating a list of the resource items in an order according to the ranking value for each of the resource items, whereby when the resource item has the ranking value associated with being ranked as most relevant to the search request received by the search engine is displayed first.

2. The method of claim 1, whereby parsing the resource items into data further includes parsing the data to include one or more text selections and associated formatting information applied to the one or more text selections.

3. The method of claim 2, whereby extracting the features from the data includes extracting statistical information for any extracted features including a frequency with which any features are found.

4. The method of claim 3, whereby passing the extracted features and the data through the ranking application for generating the ranking value for each of the resource items based on the relevance of each of the resource items to a search request received by the search engine includes passing the statistical information for the extracted features through the ranking application.

5. The method of claim 4, whereby extracting the features from the data for each of the resource items includes computing a score for a beginning point and an ending point for each extracted feature in a given resource item based on formatting information applied to a document.

6. The method of claim 5, whereby extracting the features from the data for each of the resource items includes extracting titles from the data for each of the resource items.

7. The method of claim 1, prior to passing the any extracted features and the data through the ranking application for generating the ranking value for each of the resource items, further comprising:
receiving a search request at the search engine; and
causing the list of the resource items to display in a user interface.

8. The method of claim 1, prior to parsing each of the resource items into data, receiving the resource items from one or more information sources accessed and parsed by the search engine.

9. A method, comprising:
receiving on a computing device resource items generated by a search engine in response to a search request;
obtaining resource items from an information source;
parsing a metadata source in each of the resource items for one or more metadata items, and parsing a content portion of each of the resource items into one or more text selections and associated formatting information applied to the one or more text selections;
passing the one or more metadata items and the one or more text selections and associated formatting information for each of the resource items through a feature extraction application;
extracting titles from the one or more text selections and associated formatting information for each of the resources including using formatting characteristics to determine when to extract a title from the resource item; wherein the formatting characteristics that are used include: a bold formatting characteristic; an underlining formatting characteristic; wherein the feature extraction application stores statistical information for each extracted title that provides a number of and a frequency of appearance of the extracted title;
determining applicability of the one or more metadata items by comparing the one or more metadata items against known metadata for use in ranking search results;
comparing words parsed from the text that is separate from the one or more metadata items against a database of known words that have been previously characterized;
processing the extracted titles, the one or more metadata items, the one or more text selections and the associated formatting information according to a ranking algorithm for generating a ranking value for each of the resource items based on a relevance of each of the resource items to the search request received by the search engine; and
generating a list of the resource items in an order according to the ranking value for each of the resource items.

10. The method of claim 9, further comprising displaying each of the resource items in a user interface in an order according to the ranking value for each of the resource items whereby the resource item having the ranking value associated with being ranked as most relevant to the search request received by the search engine is displayed first.

11. The method of claim 9,
whereby extracting titles from the one or more text selections and associated formatting information for each of the resource items includes extracting statistical information for any extracted titles including a frequency with which any titles are found in an associated resource item; and further comprising processing the statistical information for the any extracted titles according to a field weighting algorithm in association with processing the any extracted titles, the one or more metadata items, the one or more text selections and the associated formatting information according to the field weighting algorithm.

12. The method of claim 9, prior to processing the extracted titles, the one or more metadata items, the one or more text selections and the associated formatting information according to the ranking algorithm for generating the ranking value for each of the resource items based on the relevance of each of the resource items to the search request received by the search engine, receiving the search request at the search engine.

13. A computer-readable medium having stored thereon computer-executable instructions which when executed by a computer perform a method, comprising:

receiving resource items generated by a search engine in response to a search request, the resource items including one or more content portions and one or more metadata portions;

parsing each of the resource items into the one or more content portions and associated formatting information applied to the one or more content portions;

passing the one or more content portions and associated formatting information for each of the resource items through a feature extraction application;

determining applicability of the one or more metadata portions by comparing the one or more metadata portions against known metadata for use in ranking search results;

comparing words parsed from the content portions that is separate from the one or more metadata portions against a database of known words that have been previously characterized;

using formatting characteristics to determine when to extract a title from the resource item; wherein the formatting characteristics that are used include: a bold formatting characteristic; an underlining formatting characteristic; wherein the feature extraction application stores statistical information for each extracted title that provides a number of and a frequency of appearance of the extracted title in the data; and extracts features from the one or more content portions and associated formatting information for each of the resource items;

passing the extracted features and the one or more content portions and associated formatting information through a ranking application for generating a ranking value for each of the resource items based on a relevance of each of the resource items to the search request received by the search engine; and generating a list of the resource items in an order according to the ranking value for each of the resource items.

14. The computer-readable medium of claim 13, wherein parsing each of the resource items further comprises:

parsing the one or more metadata sources in each of the resource items for one or more metadata items; and parsing the one or more content portions into one or more text selections and associated formatting information applied to the one or more text selections.

15. The computer-readable medium of claim 14, whereby extracting features from the one or more content portions and associated formatting information and the one or more metadata portions includes extracting statistical information for any extracted features including a frequency with which any features are found in an associated resource item.

16. The computer-readable medium of claim 15, whereby passing the extracted features and the one or more content portions and associated formatting information and one or more metadata portions through the ranking application for generating the ranking value for each of the resource items based on a relevance of each of the resource items to a search request received by the search engine includes passing the statistical information for the extracted features through the ranking application with the associated extracted features.

17. The computer-readable medium of claim 16, whereby extracting features from the one or more content portions and associated formatting information and the one or more metadata portions for each of the resource items includes computing a score for a beginning point and an ending point for each extracted feature in a given resource item based on formatting information applied to a document.

18. The computer-readable medium of claim 17, whereby extracting features from the one or more content portions and associated formatting information and the one or more metadata portions for each of the resource items includes extracting titles from the one or more content portions and associated formatting information for each of the resource items.

19. The computer-readable medium of claim 13, prior to passing the any extracted features and the one or more content portions and associated formatting information through the ranking application for generating the ranking value for each of the resource items, further comprising:

receiving a search request at the search engine; and causing the list of the resource items to display in a user interface in an order according to the ranking value for each of the resource items whereby the resource item having the ranking value associated with being ranked as most relevant to the search request received by the search engine is displayed first.

20. The computer-readable medium of claim 13, prior to parsing each of the resource items into the one or more content portions and associated formatting information, receiving the resource items from one or more information sources accessed and parsed by the search engine.

* * * * *